(12) United States Patent
Bishop et al.

(10) Patent No.: US 6,506,059 B2
(45) Date of Patent: Jan. 14, 2003

(54) ELECTRICAL CONNECTORS FOR DISPLAY DEVICES

(75) Inventors: Peter Bishop, Isleham (GB); Richard Lewis, Hemel Hemstead (GB)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 09/821,828

(22) Filed: Mar. 29, 2001

(65) Prior Publication Data

US 2002/0141123 A1 Oct. 3, 2002

(51) Int. Cl.[7] .............................................. H01R 12/00
(52) U.S. Cl. ........................... 439/66; 439/910; 439/65; 349/149
(58) Field of Search ..................... 439/66, 910; 349/65, 349/149

(56) References Cited

U.S. PATENT DOCUMENTS

| | | | |
|---|---|---|---|
| 3,873,173 A | | 3/1975 | Anhalt |
| 3,960,424 A | | 6/1976 | Weisenburger |
| 3,993,384 A | | 11/1976 | Dennis et al. |
| 4,035,046 A | | 7/1977 | Kloth |
| 4,050,755 A | | 9/1977 | Hasircogin |
| 4,634,199 A | * | 1/1987 | Anhalt et al. .................. 439/66 |
| 4,660,920 A | | 4/1987 | Shibano |
| 4,995,814 A | | 2/1991 | Weidler |
| 5,709,576 A | | 1/1998 | Lippmann et al. |
| 5,967,800 A | | 10/1999 | Bishop |
| 6,006,118 A | | 12/1999 | Stephenson |
| 6,026,283 A | | 2/2000 | Stephenson |
| 6,077,089 A | | 6/2000 | Bishop et al. |
| 6,091,474 A | * | 7/2000 | Middleton et al. ........... 349/149 |
| 6,132,652 A | | 10/2000 | Higuchi et al. |
| 6,220,892 B1 | | 4/2001 | Bishop |
| 6,293,804 B2 | * | 9/2001 | Smith ........................... 439/66 |
| 6,296,493 B1 | * | 10/2001 | Michiya ....................... 439/66 |
| 6,312,263 B1 | | 11/2001 | Higuchi et al. |
| 6,350,133 B2 | * | 2/2002 | Christensen et al. ........... 349/58 |

OTHER PUBLICATIONS

PCT International Search Report for PCT/US01/50859, International File Date Oct. 23, 2001 for AVX Corporation.
EXL–36–CON 1, 09/495,607 Entitled "Low Profile Electrical Connector", Filed Feb. 1, 2000 by Peter G. Bishop et al.
EXL–36–CIP, 09/353,418 Entitled "Low Profile Electrrical Connector", Filed Jul. 15, 1999 by Peter G. Bishop et al.

* cited by examiner

Primary Examiner—Tho D. Ta
Assistant Examiner—James R. Harvey
(74) Attorney, Agent, or Firm—Dority & Manning, P.A.

(57) ABSTRACT

An electrical connector for interconnecting a display to a printed circuit board. One application of the invention provides connection between a liquid crystal display ("LCD") and a circuit board. The connector is capable of serving a dual function as both a lightguide that disperses light for the display, and as an electrical connector for interconnection of the display with the circuit board. A leg member is mounted on the connector, and the leg member includes a row of contact feet for electrical communication. The connector may include a plurality of spaced apart U-shaped strip members mounted in parallel upon a leg member, with contact feet that extend upwardly to resiliently mate with contact pads of the display and downwardly to resiliently mate with contact pads of a printed circuit board.

18 Claims, 4 Drawing Sheets

ELECTRICAL CONNECTORS FOR DISPLAY DEVICES

BACKGROUND OF THE INVENTION

The present invention relates to electrical connectors in general, and more particularly to electrical connectors used to interconnect a display device such as a liquid crystal display ("LCD" or "LCD's") to a circuit board, in a stacked configuration.

Prior art methods and devices are known for interconnecting electronic assemblies. Such methods and devices are used to connect relatively small components to adjacent electronic components, such as circuit boards. A significant problem with conventional methods and devices for interconnecting LCD's to their respective associated electronic components is the limited space afforded for such connections and assembled components.

To reduce the overall size of the end product, it is desirable to vertically "stack" such components when possible. LCD's may be arranged in a vertically stacked arrangement. LCD's often are provided in association with a lightguide device that is incorporated into the stack and adapted for distributing light around the periphery of an LCD. A typical LCD assembly mounted upon a cellular telephone, for example, includes an upper display portion and a lower circuit board portion. Sandwiched between the LCD and the circuit board is the optical lightguide. Occasionally, a connector is provided between the LCD and circuit board (i.e. adjacent the lightguide device).

Historically, LCD's have employed connections which appear on the underside of the display, with a semiconductor chip located away from the display, such as on the circuit board itself. However, modern assemblies sometimes include a mounted semiconductor chip on the glass of the upper display. A chip mounted on the glass of the upper display is helpful in some instances because it reduces the overall number of contact pads that must be provided on the lower surface of the LCD, due to the lesser number of communications that must be made external to the LCD in that instance.

Connectors designed to interconnect an LCD with a circuit board typically have been comprised of elastomeric or foam material that springs back when compressed. For example, U.S. Pat. No. 5,709,576 to Lippmann discloses an elastomeric connector that couples terminal pads of an LCD with corresponding terminal pads of a printed wiring board. Sense pads are located on the terminal strips and arranged so that a continuity test on substantially opposed contact pads will verify pad alignment. In some applications, the tendency of such elastomeric materials to resume their original shape after deformation is relied upon as a means to hold contacts in close association within the sandwich structure.

Elastomeric connectors may feature solderless contacts that connect the electrical contact pads on the LCD display with those on the printed circuit board. However, such elastomers sometimes lose their elasticity. Sometimes, electrical connection becomes faulty in such LCD's after a period of time. Elastomeric materials of this type may comprise rubbery or foamed materials that lose some of their elasticity due to age, heat, or a combination of age and heat. When a loss of elasticity occurs, the electrical connection, which depends upon such elasticity to hold contacts in resilient communication with each other, may become faulty. Slight movement of the elastomeric connector at high temperatures or in the presence of vibration may cause undesirable conductivity problems.

It is quite often difficult to solder or connect terminals or connectors between adjacent components without bridging adjacent terminals with solder. Also, it is difficult to maintain and ensure the correct relative position (sometimes called "registration") between the components during the manufacturing process and in subsequent use of the end product.

What is needed in the industry is a connector that is capable of integration with a lightguide in a reliable and compact arrangement. A display which is provided in a reliable connector and lightguide system that facilitates long term and reliable use of display devices at elevated heat and vibrational conditions would be very desirable. A system that facilitates reliable registration of electrical contacts during manufacture and use is needed.

SUMMARY OF THE INVENTION

In the invention, an electrical connector for interconnecting a display (such as an LCD) to a circuit board is provided in a stacked configuration. The connector comprises an insulating body, the body being comprised of a material that is capable of providing light to illuminate the display. In some applications, this light emitting structure is called a "lightguide". Furthermore, a leg member is provided as part of the connector. The leg member is disposed on the insulating body, and includes an outer surface that is configured for disposition adjacent to a circuit board to which the display has been electronically connected. Furthermore, at least one connector element is configured with the insulating body.

In one embodiment of the invention, the connector element may comprise a first contact foot that extends beyond the outer surface of the leg member, to enable electrical communication with the liquid crystal display. Furthermore, a second contact foot extends beyond the outer surface of the leg member for electrical communication with a circuit board. In this embodiment, the connector is positioned for registration of the connector elements with electrical contacts that are located on the display and the circuit board.

In one embodiment of the invention, the connector element includes a "U-shaped" member with a first end and a second end, wherein the U-shaped member has an arm portion with contact feet defined on the first end and contact feet defined on the second end. The connector element also comprises a closed-end that wraps around and fits upon the leg member configured in the body.

In another embodiment of the invention, the connector includes an opening that is provided in the body itself. Furthermore, the leg member includes a plurality of connector elements that are aligned and separated from the body. The opening in the body is located at least partially between the leg member and the body. During manufacturing operations, connector elements provided on a carrier strip are aligned over the leg member of the body, and then crimped down upon the leg member. The carrier strip portion is knocked out of the opening (or space) within the body that is adjacent to the leg member, leaving an opening.

At least one embodiment of the invention includes connector elements that comprise strip members which are bent into a closed-end and oppositely facing arms configuration. The contact feet are defined on the arms, and at least one of the arms is adapted for applying a resilient force to electrical contacts of the LCD.

Additional objects and advantages of the invention will be set forth in part in the following description, or may be obvious from the description, or may be learned through practice of the invention. The invention will be described in greater detail below through preferred embodiments as illustrated in the attached Figures.

DETAILED DESCRIPTION OF THE INVENTION

Figure 1:
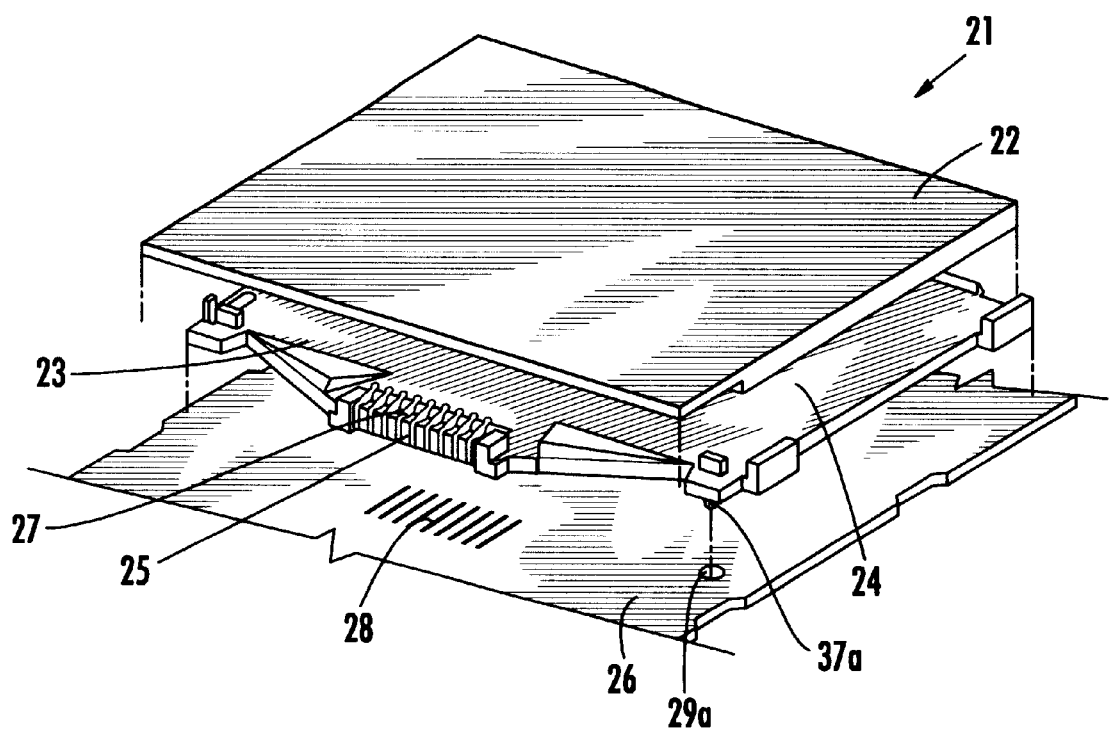
FIG. 1 is a perspective view of the connector assembly in a disassembled mode in which the parts are shown separated from each other for easy identification.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used in another embodiment to yield still a further embodiment. It is intended that the present invention include such modifications and variations.

Radio telephones, sometimes called cellular telephones, have become increasing popular for both personal and commercial use. Radio telephones have become increasingly smaller to provide more convenient storage and portability. Consequently, the space or "real estate" on circuit boards within such telephones has become limited and valuable.

A lightguide is a structure provided within an illuminated electronic device such as a radio telephone that may be utilized to illuminate a key pad of translucent keys by way of a light source that is internal to the device. The lightguide also may be utilized to support a key pad and a liquid crystal display for a radio telephone. In some designs, a lightguide is placed directly on a circuit board for hosting electronic components to generate and receive telecommunications signals. As a result, the lightguide may occupy a significant amount of circuit board real estate. Thus, circuit board space beneath a lightguide may be generally unusable for hosting electronic components.

One or more wall portions may depend from a face of the lightguide to maintain a spaced apart relationship between the lightguide and the circuit board. These wall portions may be configured to contact the circuit board face to thereby define one or more compartments between the circuit board face and the lightguide face when the lightguide is secured within a housing.

A key pad may be secured to the lightguide and may comprise a plurality of translucent keys. The keys may extend through the housing to facilitate operation of the radio telephone by a user. Each key also may extend through the lightguide. The end of each key may be engaged with a respective contact pad on the circuit board face, depending upon the particular configuration adopted in that cellular telephone.

In general, the invention as disclosed herein may be used with any other electronic device that includes a display. It is not required that the display be of the liquid crystal type, and essentially any display mechanism that is capable of communicating electrically with a connector could be employed in the application of the invention. In conventional use, the assembly consists of a printed circuit board, a lightguide, and a connector that may be comprised of elastomeric materials. The connector is assembled with the lightguide, and therefore the lightguide and the connector are provided together in a one piece unit. The elastomeric portion may include a rubber or flexible connector that compresses and makes contact between ITO pads (Indian Tin Oxide). ITO Pads are small contact areas on the surface of the display that provide an electrical communication path between the connector and the display. Furthermore, the lightguide acts to disperse light around the outside of the display to highlight the display during use at nighttime, or during low light conditions.

In the invention, a lightguide connector combination is provided to perform a dual function. First, the combination component operates as a light dispersal device, and second, it operates as a connector and insulator. In the manufacture of the invention, it is possible to assemble contacts directly upon the lightguide, which can eliminate the need for an elastomer in the use of the invention, and also eliminates the assembly operation of the elastomer into the lightguide. This saves manufacturing time and effort, and reduces costs.

The retention device and leg member used in the invention relates to another co-pending United States patent application that is directed to other types of connector assemblies i.e., co-pending U.S. Patent Application entitled "Low Profile Electrical Connectors for Microphones", filed on Jul. 15, 1999, (U.S. Ser. No. 09/354,402).

Turning to FIG. 1, a connector assembly 21 is shown in perspective view in which a liquid crystal display (LCD) is shown in the upper part of the Figure. A connector 23 is shown below the liquid crystal display 22, the connector 23 having an insulating body 24 that is adapted to mate or connect with a circuit board 26. Connector elements 27 are provided in a row along a leg member 25 on the connector 23. The connector 23 has an insulating body 24 that is adapted to disperse light around the edges to illuminate the liquid crystal display 22 when the assembly is integrated. Registration hole 29a is adapted for receipt of the alignment pin 37a, which mates the connector elements 27 exactly in correct registration with contact pads 28 of the circuit board 26.

Figure 2:
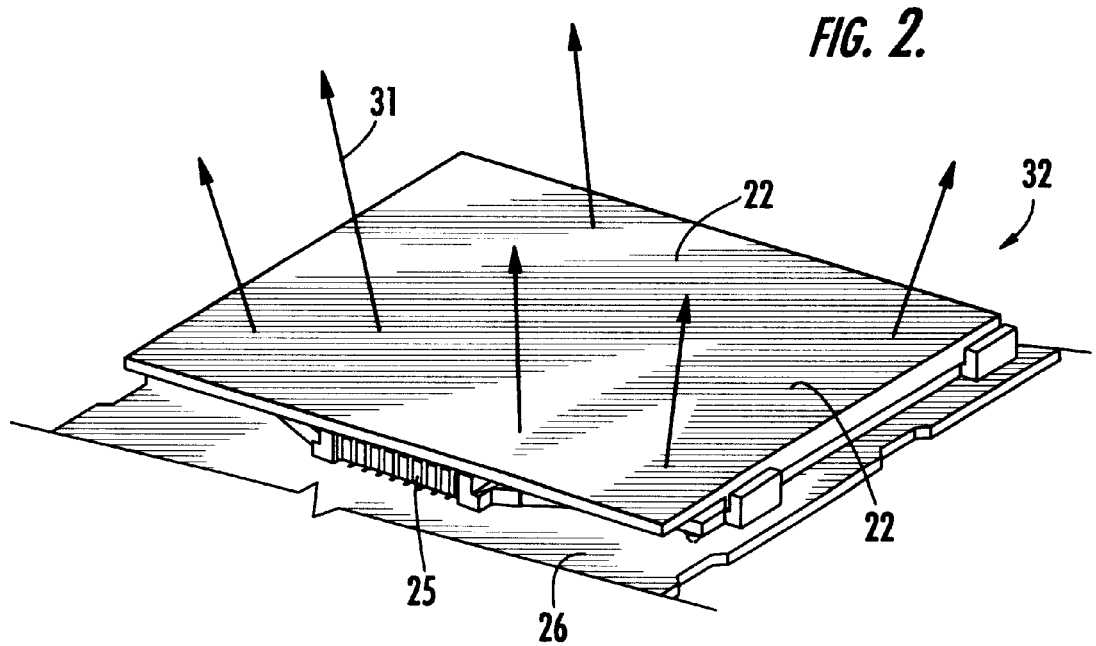
FIG. 2 shows an integrated display assembly in which the parts are integrated as they would be in a finished product.

FIG. 2 shows the integrated display assembly 32 which comprises the components seen in FIG. 1 when completely mated together in an operable unit. A liquid crystal display (LCD) 22 emits light from its upper surface as emitted light 31. Furthermore, the leg member 25 is shown immediately below the liquid crystal display 22, and the circuit board 26 forms the bottom portion of the integrated display assembly 32.

Figure 3:
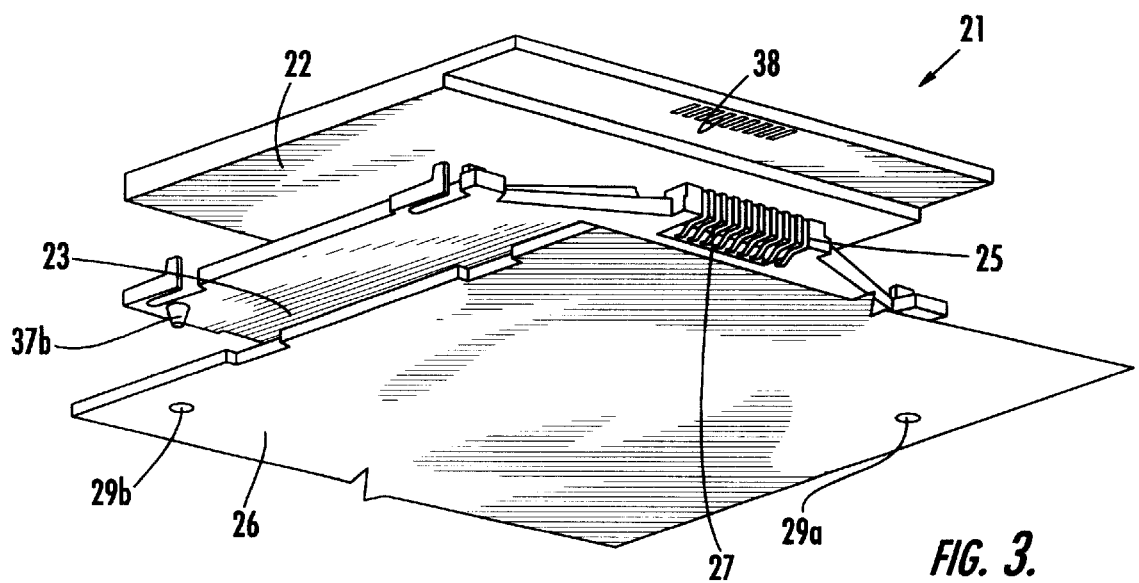
FIG. 3 is a perspective view of the underside of the assembly, wherein the portions of the assembly are separated for identification.

FIG. 3 shows an exploded view of the connector assembly 21 from the bottom, revealing the circuit board 26 having registration holes 29a–b on its lower surface. Furthermore, the leg member 25 of the connector 23 is shown, having alignment pin 37b which is adapted for insertion into registration hole 29b. Furthermore, liquid crystal display 22 receives light from the connector 23. Connector elements 27 located along the leg member 25 are adapted to interact with contact pads 38 of the liquid crystal display 22 on the upper surface of the connector 23, and the connector elements 27 interact with the circuit board 26 below the surface of the connector 23.

Figure 4:
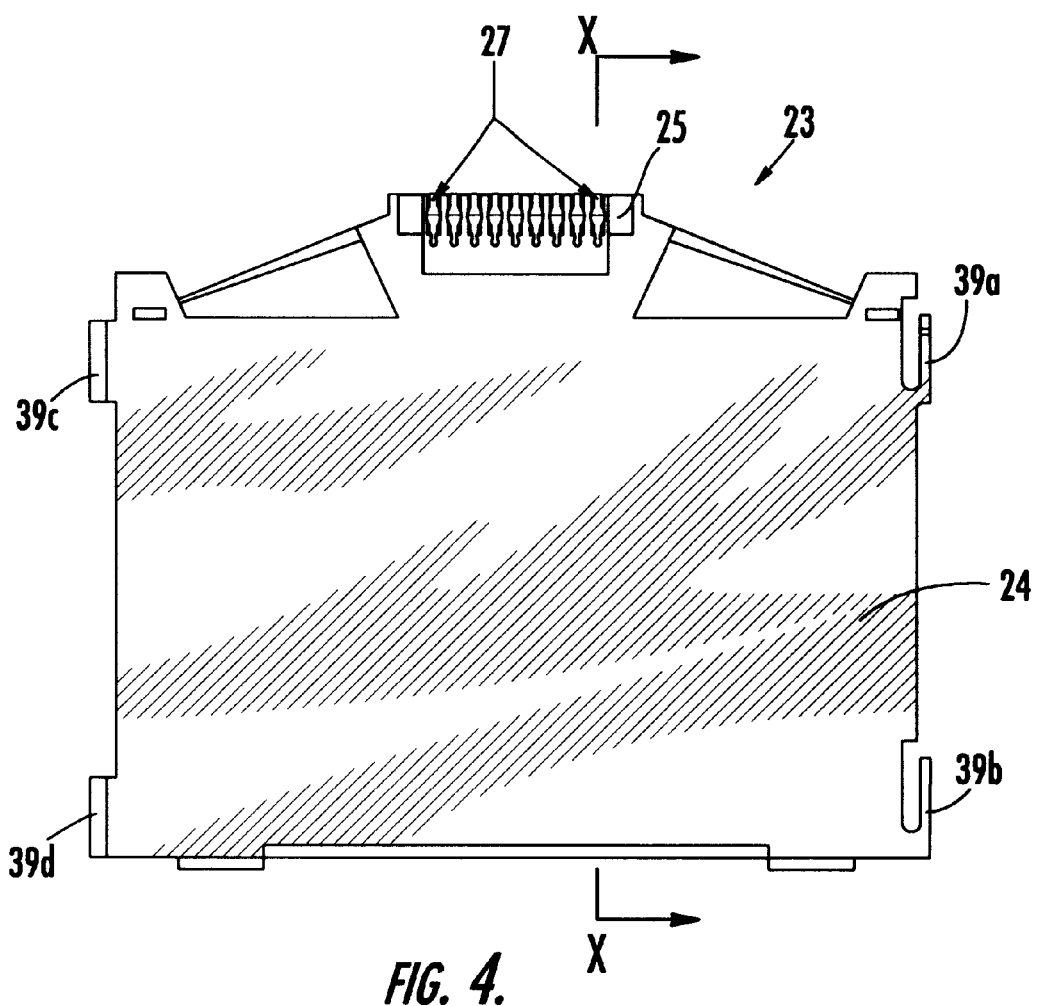
FIG. 4 is a top view of the connector (sometimes called a "lightguide") of the invention.

In FIG. 4, a top view of the connector 23 is shown. The insulating body 24 includes along one side a leg member 25 having connector elements 27 spaced along the leg member 25. On opposite sides of the insulating body 24, registration features 39a and 39b are shown, which are opposite registration features 39c and 39d. The registration features 39a–d are provided to interlock the connector 23 with corresponding features located on the edge of circuit board 26 (not shown in FIG. 4). These registration features 39a–d ensure that the connector 23 is provided at exactly the right location to mate the connector elements 27 with their corresponding contact pads on both the liquid crystal display 22 and the circuit board 26. Furthermore, the registration features 39a–d also assist in securing the connector 23 to avoid unnecessary vibration or movement during use of the device.

Figure 5:
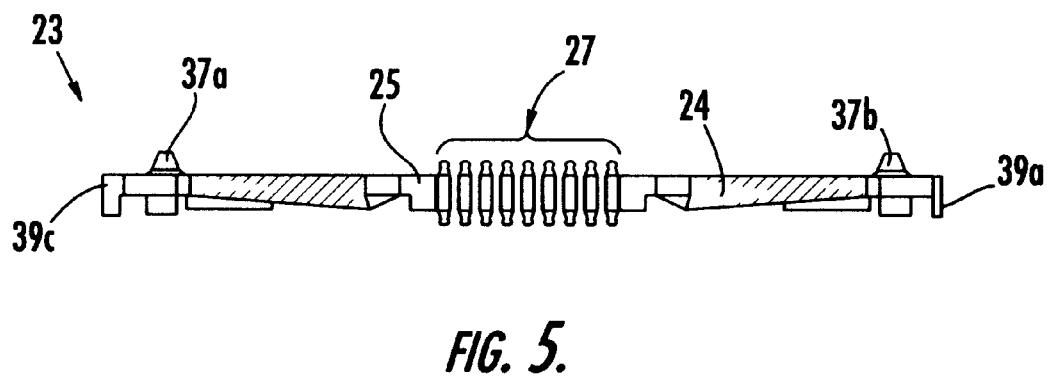
FIG. 5 is an end view of the connector shown in FIG. 4.

FIG. 5 shows an end view of the connector 23 shown in FIG. 4, with connector elements 27 along the leg member 25, which is attached to the insulating body 24. On either side of the connector 23 are alignment pins 37a–b. Furthermore, registration features 39a and 39c are seen on the edge of the connector 23.

Figure 6:
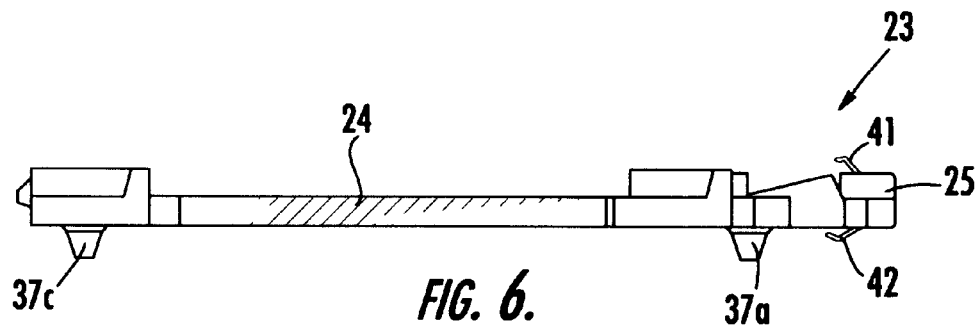
FIG. 6 is a side view of the connector shown in FIGS. 4–5.

FIG. 6 shows a side view of the connector 23 of FIGS. 1 and 3 in which an insulating body 24 is shown with alignment pins 37a and 37c shown on the underside of insulating body 24. A first contact foot 41 and a second contact foot 42 extend above and below, respectively, the leg member 25 for electrical communication. The first contact foot 41 and the second contact foot 42 are provided at an angle from the leg member 25, to afford a resilient spring action against respective contact pads.

Figure 7:
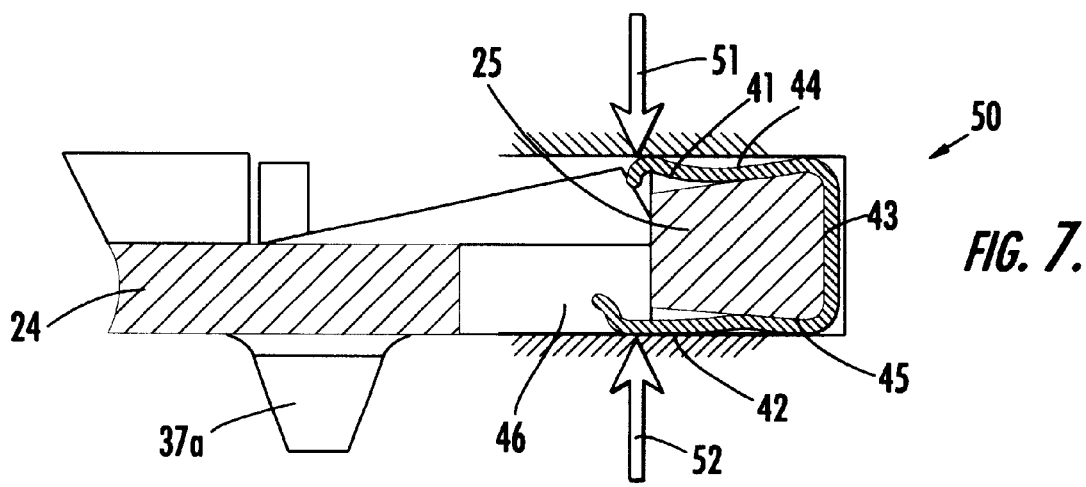
FIG. 7 is a cross-sectional side view taken along lines X—X of FIG. 4 of the insulating body.

In FIG. 7, a cross-section along lines X—X shows the first embodiment (i.e.: FIGS. 1–6) in cross-section with the connector 23 in the assembled configuration 50. In the assembled configuration 50, the first contact foot 41 and the second contact foot 42 are pushed down to a position which is roughly parallel with the sides of the leg member 25. An arm portion 44 and an arm portion 45 are pushed closely against the leg member 25. Thus, the U-shaped member 43 is now in full contact with the display 22 and the circuit board 26 (not shown in FIG. 8). The display contact pad connection point 51 is shown on the upper surface of the insulating body 24, and the circuit board contact pad connection point 52 is shown on the lower surface of the insulating body 24. Alignment pin 37a is shown on the lower surface of the insulating body 24. The opening 46 which lies between at a point roughly between the leg member 25 and the insulating body 24 is shown.

Figure 8:
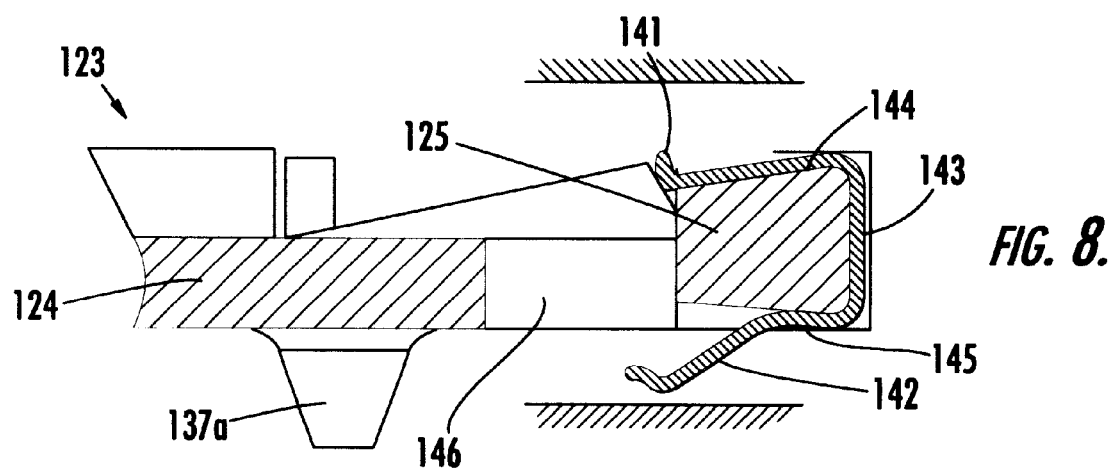
FIG. 8 is an alternative embodiment of the invention showing a cross-sectional side view of a device having the upper contacts provided flat against the leg member and available for adhesive bonding to contact pads of the display device.

In FIG. 8, a second alternate embodiment of the connector is shown, which is a cross-section taken along lines X—X (see FIG. 4). This alternative embodiment reveals an insulating body separated by an opening 146 from the leg member 125. The opening 146 is the point at which a carrier strip (not shown) is located during manufacture of the connector 123, in which the carrier strip is "punched out" through the opening 146 during manufacture at the point at which the "U-shaped" member 143 is secured to the leg member 125. The U-shaped member 143 has an arm portion 144 and an arm portion 145 on either end. The arm portion 144, in this particular configuration, is shown as a "flat beam", rather than a formed sprung contact beam as previously shown in FIG. 6. In this particular configuration, the flat beam portion is to be bonded directly to the contact pads 38 on the liquid crystal display 22. The bonding is accomplished using one of many commercially available conductive adhesives, of a type known to persons of skill in the art. Furthermore, a first contact foot 141 and a second contact foot 142 are provided above and below, (respectively) the insulating body 124.

When the integrated display assembly 32 is assembled as shown in FIG. 2, the connector 23 is put together by mechanically confining the sides of the connector and compressing it through its height thereby pressing the conducting elements of the connector onto contact pads 38 and contact pads 28. The pitch between conductive elements on the connector 23 may be 0.1 mm or finer. In general, it is considered good practice to design elastomeric connection systems so that the contact pads 28 and are at least as wide as the distance spanned by three consecutive conductive elements in the connector 23 so that the space between the pads will be at least about the same width.

With the structure of the retention device described herein as shown in FIG. 1, it is a relatively simple process to press the connector elements 27 onto body 24, and particularly onto leg member 25. The closed end of U-shaped member 43 is pressed onto the end of the leg member 25.

In a typical application of the invention, a radio telephone will include a housing, a keypad, and the connector 23 as shown in the invention which also serves as a lightguide for illuminating the keypad from a light source within the radio telephone. Furthermore, various electronic components are adapted for receiving and transmitting telecommunications signals secured to a circuit board. A face of the circuit board also includes a plurality of contact pads. The lightguide is secured within the housing in a spaced apart relationship with the circuit board to define one or more compartments between the lightguide and the circuit board face.

One or more wall portions may extend from the face of the lightguide to maintain a spaced apart relationship between the lightguide and the circuit board. These wall portions may be configured to contact the circuit board face to thereby define one or more compartments between the circuit board face and the lightguide face when the lightguide is secured within the housing. For example, a wall portion may depend from the lightguide along peripheral edge portions to define a compartment between the circuit board face and the lightguide.

A keypad may be secured to the lightguide and may comprise a plurality of translucent keys. Each key is a first end extending through the housing to facilitate operation of the radio telephone by a user. Each key also has a second end extending through the lightguide. The second end of each key is operably engaged with a respective contact pad on the circuit board face.

It should be appreciated by those skilled in the art that various modifications and variations can be made in the present invention without departing from the scope and spirit of the invention. It is intended that the present invention include such modifications and variations as come within the scope and spirit of the appended claims and their equivalents.

What is claimed:

1. An electrical connector for interconnecting a light emitting display having a light source to a circuit board, in a stacked configuration, the connector being adapted to fit between and electrically connect contact locations on a light emitting display with contract locations on a circuit board, the connector comprising:

an insulating body, said insulating body being comprised of a material that is capable of reflecting light from the light source to illuminate the display;

a leg member, said leg member disposed upon said insulating body, said leg member being configured for disposition adjacent a circuit board to which the display is electronically connected; and at least one U-shaped connector element mounted upon said leg member of said insulating body, said U-shaped connector element having a closed end positioned against and secured to said leg member, said U-shaped connector element further comprising an open end defined by a first contact foot and a second contact foot, said first and second contact feet projecting in opposite directions and away from said leg member, said first contact foot being positioned for resilient electrical contact to the display, said second contact foot being positioned for resilient electrical contact with the circuit board, wherein said first and second contact feet of said U-shaped connector element are held between the display and the circuit board, said first and second feet each being configured for making electrical connection at contact locations between the display and circuit board.

2. The connector of claim 1 in which a plurality of connector elements are aligned upon said leg member of said insulating body.

3. The connector of claim 2 in which an opening is provided in said insulating body, said leg member having a plurality of connector elements aligned thereon, said leg member being separated from said body by said opening, said opening in said body being located at least partially between said leg member and said body.

4. The connector of claim 2 in which the first contact foot of the connector element is adapted to mate with corresponding contact pads upon the display.

5. The connector of claim 2 in which the second contact foot of the connector element is adapted to mate with corresponding contact pads upon the circuit board.

6. The connector as in claim 4, wherein the connector elements comprise strip members bent into a closed-end and oppositely facing arms configuration, said contact feet defined on said arms, at least one of the arms being adapted for applying a resilient force to electrical contacts of the display.

7. The connector as in claim 6, wherein at least one of the feet is adapted for applying a resilient force to electrical contacts upon the display.

8. A display apparatus having a dual function connector, the dual function connector being adapted for operating both as a lightguide and as an electrical connector for interconnecting a liquid crystal display to a circuit board, in a stacked configuration, comprising;

(a) a liquid crystal display having an upper and lower surface, said liquid crystal display having contact pads on said lower surface;

(b) a circuit board having an upper surface and a lower surface, said circuit board having contact pads on said upper surface;

(c) a connector, said connector having an upper and lower surface, the connector being adapted to electrically connect to the liquid crystal display on said lower surface of said display, said connector further being adapted to connect to said circuit board on the upper surface of said circuit board, the connector further comprising:

i) an insulating body, said insulating body being comprised of a material that is capable of reflecting light to illuminate the liquid crystal display;

ii) a leg member, the leg member being disposed on the insulating body, the leg member having an outer surface configured for disposition adjacent said circuit board; and iii) a plurality of parallel connector elements configured with said insulating body, at least one of said connector elements comprising a first contact foot extending beyond the outer surface of the leg member for electrical communication with a contact pad of the liquid crystal display, and a second contact foot extending beyond the outer surface of the leg member for electrical communication with a contact pad of the circuit board, said connector being held between said display and said circuit board, said connector providing resilient contact to said lower surface of said display and said upper surface of said circuit board.

9. The display apparatus as in claim 8, wherein at least one of the plurality of parallel connector elements comprises a U-shaped member with a first end and a second end, the U-shaped member having an arm portion with contact feet defined on the first end, and an arm portion with contact feet defined on the second end, the connector element further comprising a closed-end wrapping around and fitted onto the leg member configured in the body.

10. The connector of claim 9 in which at least two of said plurality of parallel connector elements comprise U-shaped members having a first end and a second end, the U-shaped members having an arm portion with contact feet defined on the first end, and an arm portion with contact feet defined on the second end, the connector element further comprising a closed-end wrapping around and fitted onto the leg member configured in the insulating body.

11. The connector of claim 10 in which an opening is provided in the body, wherein the leg member includes a plurality of parallel connector elements aligned thereon which are separated from the insulating body such that the opening in the body is located generally between the leg member and the body.

12. The connector as in claim 10, wherein the connector elements comprise strip members bent into a closed-end and oppositely facing configuration, said strip members being adapted for applying a resilient force to electrical contacts of the liquid crystal display.

13. A system for interconnecting a liquid crystal display to a circuit board, comprising:

(a) a liquid crystal display having an upper surface and a lower surface, said display having contact pads on said lower surface;

(b) a circuit board having an upper surface and a lower surface, said circuit board having contact pads on said upper surface;

(c) a connector, the connector having an upper and lower surface, the connector being adapted to electrically connect to the liquid crystal display on said lower surface of said display, and to a circuit board on said upper surface of said circuit board, the connector comprising:

i) an insulating body;

ii) a leg member, the leg member being disposed upon the insulating body, the leg member having an outer surface configured for disposition adjacent a circuit board to which the liquid crystal display is to be electronically connected; and iii) a plurality of parallel connector elements configured with the insulating body, at least one of said plurality of parallel connector elements comprising a first contact foot and a second contact foot, the first contact foot extending beyond the outer surface of the leg member for electrical communication with a contact pad of the liquid crystal display on said lower surface of said liquid crystal display, and the second contact foot extending beyond the leg member for electrical communication with a contact pad of the circuit board on said upper surface of said circuit board.

14. The system of claim 13 in which at least one of the plurality of connector elements is comprised of a U-shaped member.

15. The system of claim 14 in which said U-shaped member comprises a foot portion with contact feet defined on the first end, and a foot portion with contact feet defined on the second end, at least one connector element further comprising a closed-end wrapping around and fitted onto the leg member configured in the insulating body.

16. The system of claim 15 in which the connector further comprises a locating pin.

17. The system of claim 15 in which the contact feet are curved inwardly, thereby providing for resilient contact of the circuit board and liquid crystal display.

18. An electrical connector for interconnecting a light emitting display having a light source to a circuit board, in a stacked configuration, the connector being adapted to electrically connect contact locations on a light emitting display with contract locations on a circuit board, the connector comprising:

an insulating body, said insulating body being comprised of a material that is capable of reflecting light from the light source to illuminate the display;

a leg member, said leg member disposed upon said insulating body, said leg member being configured for disposition adjacent a circuit board to which the display is electronically connected; and at least one U-shaped connector element mounted upon said leg member of said insulating body, said U-shaped connector element having a single closed end, said closed end being positioned against and held in contact with said leg member, said closed end defining a center of said U-shaped connector element, said U-shaped connector element further comprising an open end defined by a first contact foot and a second contact foot, said first contact foot projecting above and adjacent said leg member and said second contact foot projecting below said leg member, said first contact foot being positioned for resilient electrical contact to said display, said first contact foot being biased in a first direction from said center towards said display for said resilient contact with said display, and said second contact foot being positioned for resilient electrical contact with said circuit board, said second contact foot being biased in a second direction from said center and towards said circuit board for resilient contact with said circuit board.

* * * * *